C. A. OLSON.
TRACTION ENGINE.
APPLICATION FILED OCT. 20, 1910.
1,036,691.
Patented Aug. 27, 1912.
3 SHEETS—SHEET 2.
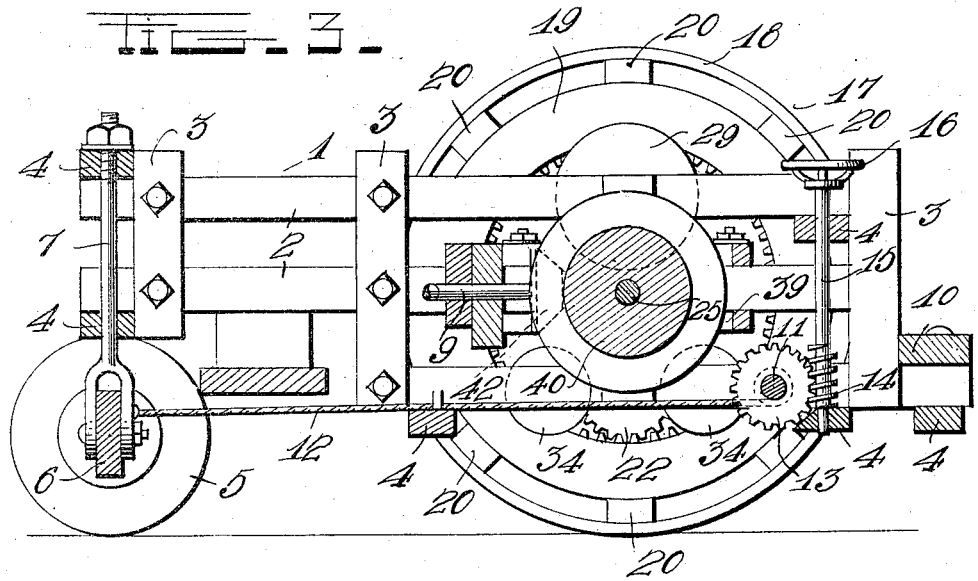
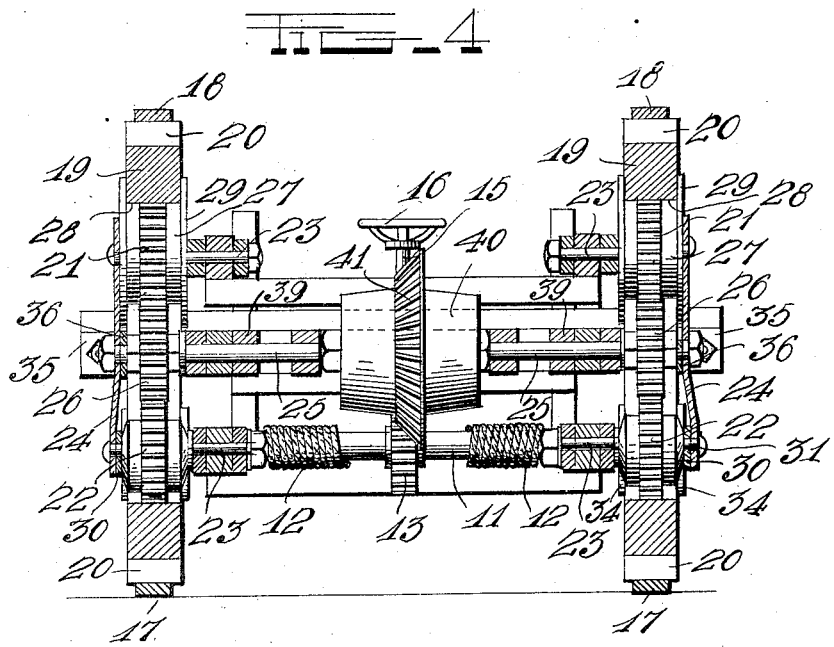
Witnesses
C. P. Haray
O. B. Hopkins
Inventor
Carl A. Olson
by H. B. Willson & Co.
Attorneys C. A. OLSON.
TRACTION ENGINE.
APPLICATION FILED OCT. 20, 1910.
1,036,691.
Patented Aug. 27, 1912.
3 SHEETS—SHEET 3.
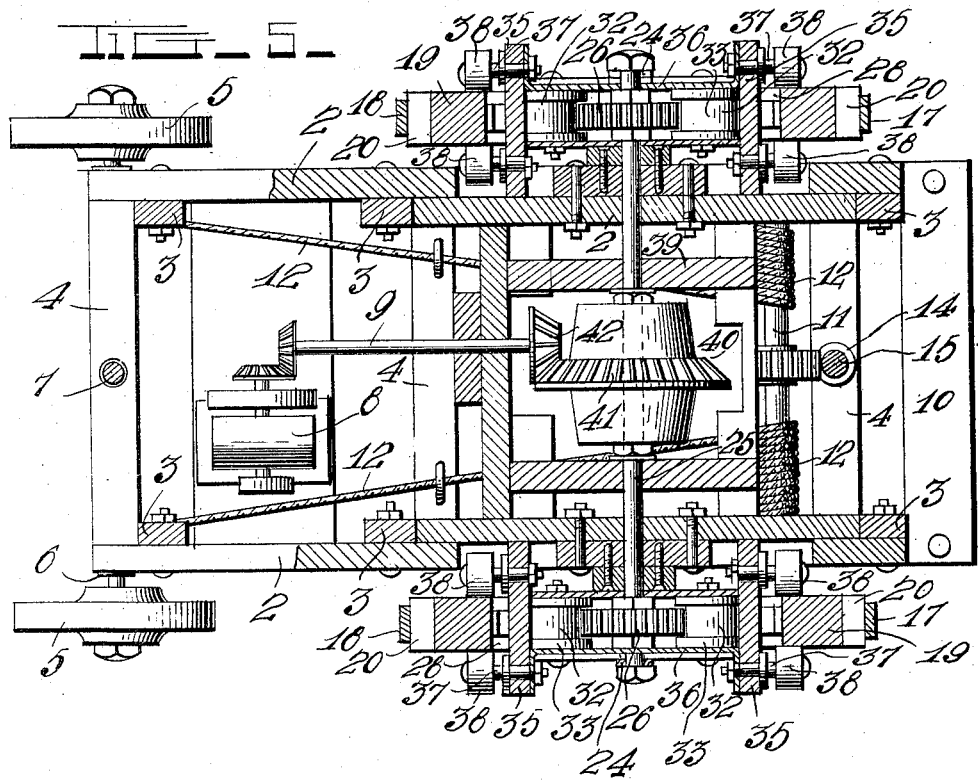
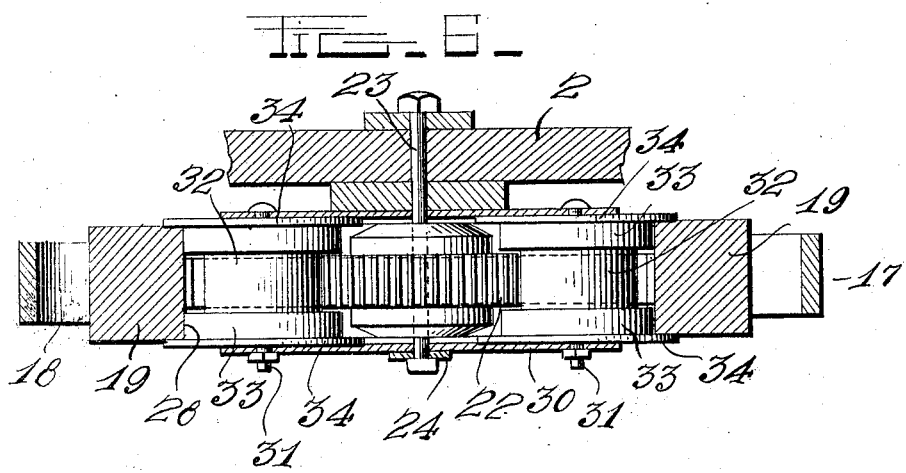
Witnesses
C. R. Hardy
O. B. Hopkins
Inventor
Carl A. Olson
By H. B. Willson & Co.
Attorneys

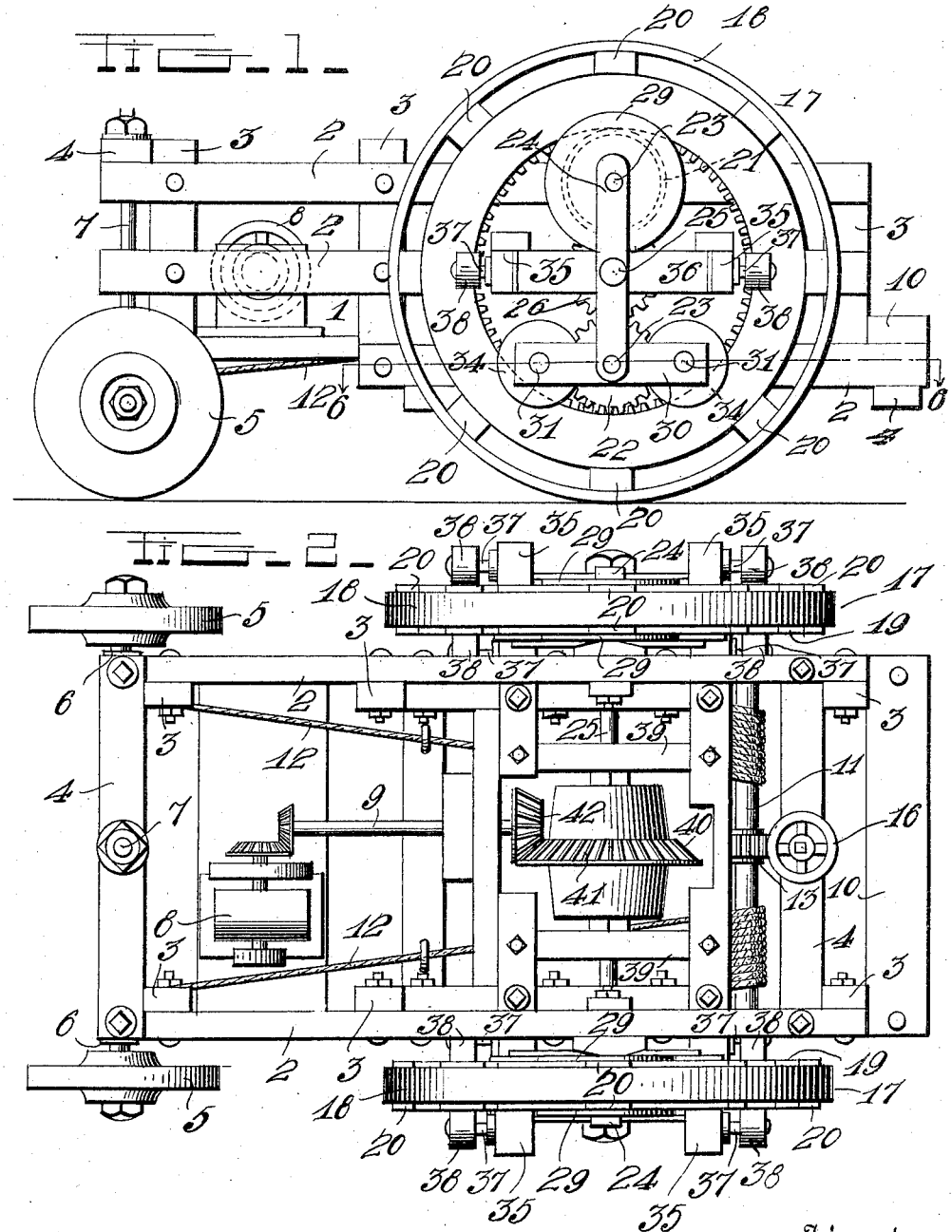

UNITED STATES PATENT OFFICE.

CARL A. OLSON, OF MILAN, MINNESOTA.

TRACTION-ENGINE.

1,036,691.  Specification of Letters Patent.  Patented Aug. 27, 1912.

Application filed October 20, 1910. Serial No. 588,130.

*To all whom it may concern:*

Be it known that I, CARL A. OLSON, a citizen of the United States, residing at Milan, in the county of Chippewa and State of Minnesota, have invented certain new and useful Improvements in Traction-Engines; and I do declare the following to be a full, clear, and exact description of the invention, such as will enable others skilled in the art to which it appertains to make and use the same.

This invention relates to improvements in traction engines.

The object of the invention is to provide a traction engine having an improved construction and arrangement of power transmitting gears adapted to be operated by any suitable form of motor whereby the efficiency of the latter is increased and the power equalized and distributed to the traction wheels for the purpose of propelling the engine.

With the foregoing and other objects in view the invention consists of certain novel features of construction, combination and arrangement of parts as will be hereinafter more fully described and particularly pointed out in the appended claim.

In the accompanying drawings, Figure 1 is a side view of a traction engine constructed in accordance with the invention. Fig. 2 is a top plan view. Fig. 3 is a central vertical longitudinal section. Fig. 4 is a vertical cross section taken on a line with the axle of the traction wheel. Fig. 5 is a horizontal section taken on a line with the axle of the traction wheel. Fig. 6 is a detail horizontal section through one of the traction wheels and a portion of the frame taken on the line 6—6 of Fig. 1.

Referring more particularly to the drawings 1 denotes the supporting frame of the engine, said frame comprising a series of parallel longitudinally disposed side bars 2 which are connected together by a series of vertically disposed bars 3 and horizontally disposed cross bars 4. The front end of the frame is supported by steering wheels 5 arranged on a front truck 6 pivoted in the bifurcated lower end of a standard 7 which is revolubly mounted in the front cross bars of the frame as shown. By thus connecting the truck 6 to the frame, said truck is permitted to turn freely in either direction for the purpose of steering the machine and may also rock or tilt upwardly and downwardly at its opposite ends in the bifurcated lower end of the standard.

In the front portion of the frame is arranged a motor 8 which may be of any suitable construction and which, for illustrative purposes, is here shown in the form of a gas engine. The engine or motor 8 is supported on a suitable platform and has its drive shaft 9 operatively connected with the driving or traction wheels of the engine by means of a suitable power transmitting mechanism hereinafter described. On the rearwardly projecting ends of the lower side bars of the frame is arranged a platform 10 upon which the operator may stand.

Revolubly mounted in the lower side bars of the frame immediately in front of the platform 10 is a steering shaft 11 with which are connected the rear ends of steering cables or chains 12, said ends of the chains being adapted to be wound on the ends of the shaft in opposite directions and the forward ends of said cables are connected to the front truck near the outer ends thereof. By thus connecting the cables to the front truck and to the steering shaft 11, the latter, when turned in one direction or the other, will wind one cable and unwind the other thereby turning the steering truck and wheels in the desired direction. The steering shaft 11 is provided with an operating mechanism which is here shown and preferably comprises a worm gear 13 which is fixedly mounted on the shaft midway between its ends and is adapted to be engaged and driven by a worm 14 arranged on the lower end of a steering post 15 revolubly mounted in the upper and lower cross bars of the frame and having on its upper end a hand wheel 16 whereby the post may be turned and the steering mechanism controlled by the operator standing on the rear platform 10.

The rear portion of the machine is supported upon driving or traction wheels 17 each of which comprises an outer rim 18 in which is arranged an annular, internally threaded gear rack or ring 19 spaced a suitable distance from and secured to said rim by a series of spacing blocks 20 arranged around between the rim and rack as shown. With the teeth of the annular racks 19 mesh upper and lower power transmitting pinions 21 and 22, said pinions being revolubly mounted on suitable shafts 23 arranged in the opposite ends of pairs of gear supporting bars 24 loosely mounted on the outer end of a driving and supporting shaft 25 which is revolubly mounted in the frame of the machine. The pinions 21 and 22 of each of the traction wheels are also in operative engagement with drive pinions 26 which are fixedly mounted on the opposite ends of the drive shaft 25 whereby, when said shaft is operated, the movement thereof will be transmitted through said pinions to the annular racks of the traction wheels and the latter thus driven. Fixed to the opposite ends of the hub 27 of the upper pinion 21, and spaced a suitable distance from the latter are arranged disks.

On the shaft 23 of the lower pinions 22 are arranged pairs of horizontally disposed plates 30 which project beyond the opposite edges of the pinion and serve as bearing brackets in which are revolubly mounted the shafts 31 of guide rollers 32, said rollers having depressed central portions to receive the annular series of teeth of the gear rings, said depressed central portions of the rollers forming annular bearing surfaces 33 which are adapted to engage and travel on the annular bearing surfaces 28 of the gear ring. The rollers 32 are further provided on their opposite ends with annular, radially projecting retaining flanges 34 which engage the opposite sides of the annular gear rings or racks 19 of the wheels and serve in addition to the flanges 29 of the pinion 21 to hold said rings or racks in operative engagement with the pinions 21 and 22.

Bolted or otherwise secured to the central side bars of the frame are laterally projecting bracket bars or arms 35, the outer ends of which project through the annular gear rings or racks 19 and are connected together by brace bars 36 through which the ends of the drive shaft project. On the extended ends of the bracket arms 35 are outwardly projecting pairs of stud shafts or bearing bolts 37 on which are revolubly mounted pairs of guide rollers 38 which revolubly engage the inner and outer sides of the gear rings or racks 19 and serve as an additional means in connection with the flanged pinions and the guide rollers hereinbefore described, to hold the traction wheels in operative position.

In the center of the frame 1 of the machine and secured to the inner ends of the bracket arms or bars 35 is a gear supporting frame 39 through which the drive shaft 25 extends. On the shaft 25 in the frame 39 is fixedly mounted a differential drive gear 40 having an outer annular series of bevel gear teeth 41 with which are engaged the teeth of a bevel gear pinion 42 fixedly mounted on the rear end of the motor shaft 9 whereby the power or action of the motor is transmitted to the drive shaft 25 and through the same and the gears operated thereby is evenly distributed to the traction wheels racks in the manner described thereby driving said wheels and propelling the engine.

From the foregoing description taken in connection with the accompanying drawings, the construction and operation of the invention will be readily understood without requiring a more extended explanation.

Various changes in the form, proportion and the minor details of construction may be resorted to without departing from the spirit or sacrificing any of the advantages of the invention as defined in the appended claim.

Having thus described my invention what I claim is:

The combination with a frame of a traction engine and propelling shaft thereof, of traction wheels composed of rims having internal gear teeth, pinions fixed to said shaft, frames movably mounted upon the opposite outer ends of the latter, said frames being each composed of vertical bars secured to the shaft midway their lengths, flanged gears mounted in the upper ends of the bars and meshing with the pinions on the shaft and internal teeth of the rims, transverse bars movably mounted on the lower ends of the vertical bars, flanged rollers mounted in the opposite ends of the transverse bars and in movable contact with the opposite sides of the rims and teeth thereof, and also with the sides of the gears carried by the lower ends of the vertical bars, brackets projecting from the frame of the machine and through the rims of the wheels, and rollers revolubly mounted upon said brackets and adapted for frictional contact with the opposite sides of the rims of the wheels adjacent to the teeth thereof, the gears mounted in the upper ends of the vertical bars being provided with flanges for frictional contact with the rims, whereby the bars are held in operative position.

In testimony whereof I have hereunto set my hand in presence of two subscribing witnesses.

CARL A. OLSON.

Witnesses:
 NORMAN HORR,
 H. A. THIELKE.

Copies of this patent may be obtained for five cents each, by addressing the "Commissioner of Patents, Washington, D. C."